(12) United States Patent
Schoefberger et al.

(10) Patent No.: US 7,686,852 B2
(45) Date of Patent: Mar. 30, 2010

(54) MONOAZO DYES

(75) Inventors: Georg Schoefberger, Rheinfelden (CH); Urs Daettwyler, Gempen (CH)

(73) Assignee: Clariant Finance (BVI) Limited, Tortola (VG)

( * ) Notice: Subject to any disclaimer, the term of this patent is extended or adjusted under 35 U.S.C. 154(b) by 259 days.

(21) Appl. No.: 11/596,938

(22) PCT Filed: May 12, 2005

(86) PCT No.: PCT/IB2005/001465

§ 371 (c)(1), (2), (4) Date: Nov. 17, 2006

(87) PCT Pub. No.: WO2005/113683

PCT Pub. Date: Dec. 1, 2005

(65) Prior Publication Data

US 2008/0028543 A1     Feb. 7, 2008

(30) Foreign Application Priority Data

May 19, 2004   (EP)   ................ 04011856

(51) Int. Cl.
*D06P 3/06*   (2006.01)
(52) U.S. Cl. .............. 8/538; 8/916; 8/918; 8/920
(58) Field of Classification Search ............ 8/538, 8/916, 918, 920
See application file for complete search history.

(56) References Cited

U.S. PATENT DOCUMENTS

| 4,041,024 A | 8/1977 | Wolfrum et al. | |
|---|---|---|---|
| 4,517,358 A | 5/1985 | Ramanathan | |
| 4,581,445 A | 4/1986 | Ramanathan | |
| 5,542,955 A * | 8/1996 | Schrell et al. | 8/561 |
| 5,725,606 A * | 3/1998 | Jordine | 8/641 |

FOREIGN PATENT DOCUMENTS

| DE | 33 13 337 A1 | 10/1983 |
|---|---|---|
| EP | 0739952 A2 | 10/1996 |
| EP | 1066340 B1 | 10/1999 |
| JP | 04-046186 A | 5/1992 |
| WO | WO99/51681 A1 | 10/1999 |
| WO | WO02/46318 A1 | 6/2002 |

OTHER PUBLICATIONS

STIC Search Report dated Nov. 21, 2008.*
Bull. Soc. Chim. France 1974, 641-648.
Ullmanns Encyklopädie der technischen Chemie, 4th Edition, 1982, vol. 22, pp. 658-673.
M. Peter and H.K. Rouette, Grundlagen der Textilveredlung, 13th Edition, 1989, pp. 535-556 and 566-574.
PCT International Search Report for PCT/IB2005/001419, dated Oct. 5, 2005.
PCT Written Opinion of the International Searching Authority for PCT/IB2005/001419, dated Oct. 5, 2005.
English Abstract for JP 04-046186. (1992).
English Abstract for DE 33 13 337 A1, (1983).
PCT International Search Report for PCT/IB2005/001465, dated Nov. 11, 2005.
PCT Written Opinion of the International Searching Authority for PCT/IB2005/001465, dated Nov. 11, 2005.

* cited by examiner

*Primary Examiner*—Eisa B Elhilo
(74) *Attorney, Agent, or Firm*—Tod A. Waldrop

(57) ABSTRACT

Compounds of the general formula (I)

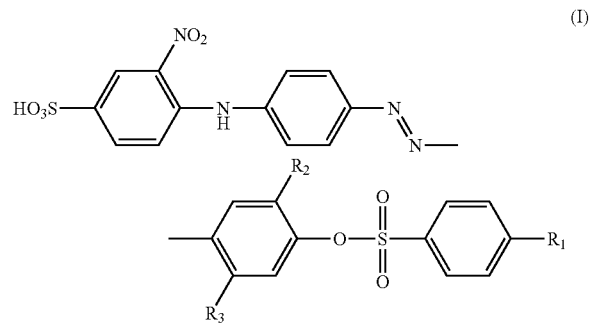

a process for their preparation and their use for dyeing and/or printing organic substrates.

9 Claims, No Drawings

MONOAZO DYES

The invention relates to novel acid dyes, to a process for their preparation and to their use for dyeing organic substrates.

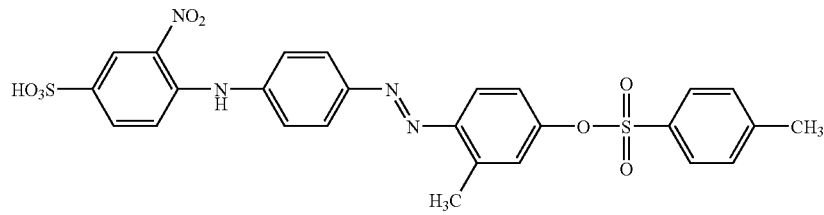

C.I. Acid Orange 67 (CAS No. 12220-06-3; C.I. 14172)

is well known and is used for dyeing wool, polyamides, leather and paper. C.I. Acid Orange 67 is soluble in hot water, but partly reprecipitates on cooling. This leads to inaccuracies with regard to dye concentration and hence to fluctuations with regard to recipe formulation and affects reproducibility. It also impedes the smooth transfer of laboratory-devised recipes to the dyehouse. These problems are solved by the dyes of the invention.

The invention accordingly provides compounds of the general formula (I)

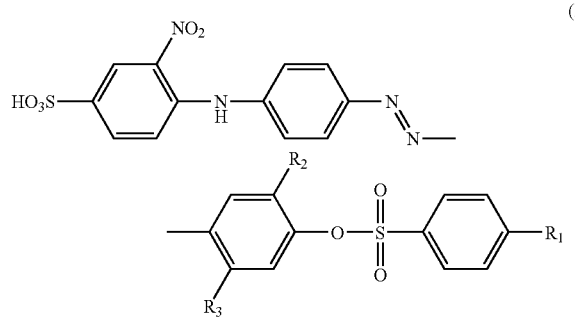

where $R_1$ is unbranched $C_{3-6}$alkyl or branched $C_{3-6}$alkyl $R_2$ is H or methyl or unbranched $C_{2-4}$alkyl or branched $C_{3-4}$alkyl $R_3$ is H or methyl or unbranched $C_{2-4}$alkyl or branched $C_{3-4}$alkyl or methoxy or unbranched —$OC_{2-4}$alkyl or branched —$OC_{3-4}$alkyl or —NHCO—($C_{1-4}$alkyl) with an unbranched $C_{1-4}$alkyl group or —NHCO—($C_{3-4}$alkyl) with a branched $C_{3-4}$alkyl group.

In preferred compounds of the formula (I)

$R_1$ is unbranched $C_{3-6}$alkyl or branched $C_{3-6}$alkyl $R_2$ is H or methyl $R_3$ is H, methyl, methoxy, ethoxy or acetylamino.

In particularly preferred compounds of the formula (I)

$R_1$ is unbranched $C_{3-4}$alkyl or branched $C_{3-4}$alkyl $R_2$ is H $R_3$ is H or methyl.

Very particular preference is given to compounds of the formula (I) wherein $R_1$ is tertiary butyl, 1-methyl-propyl, or 2-methyl-propyl $R_2$ is H $R_3$ is H or methyl.

Preference is further given to compounds of the formula (I) wherein $R_1$ is a tertiary butyl group.

The branched $C_{3-6}$alkyl groups or unbranched $C_{3-6}$alkyl groups can be further substituted with hydroxyl groups or cyano groups. Preferably, the alkyl groups are not further substituted.

The invention also provides a process for preparing compounds of the formula (I). Compounds of the formula (I) are effected by reacting the hydroxy azo dyes with the appropriate alkylbenzenesulphonyl chlorides under known conditions.

In the process, compounds of the formula (II)

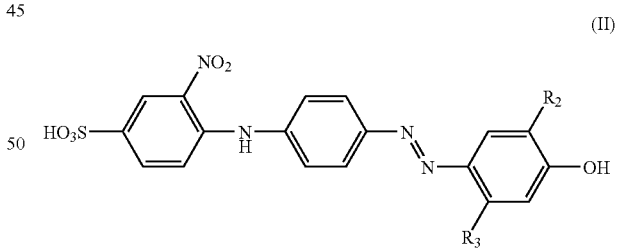

are esterified under basic conditions with the appropriately substituted sulphonyl chlorides (III)

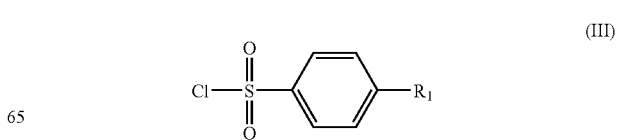

The pH of the reaction solution is held at about between 8 and 11 and preferably between 9 and 9.5 using a base. Useful bases include inorganic bases, especially alkali or alkaline earth metal hydroxides or carbonates. The preferred base is an alkali metal hydroxide, such as KOH or NaOH or LiOH, but especially NaOH. They are preferably used in the form of their aqueous solutions.

The starting compounds of the formula (II) and the sulphonyl chlorides employed are known compounds or can be prepared similarly to known methods of making starting from known compounds. Technical-grade qualities of para-alkyl-benzenesulphonyl chlorides often contain 1 to 10% of the corresponding meta-isomer.

The dyes of the formula (I) can be isolated from the reaction medium as per known processes, for example by salting out with an alkali metal salt, filtration and drying, if appropriate under reduced pressure at elevated temperature.

Depending on the reaction and/or isolation conditions, the dyes of the formula (I) can be obtained as free acid, as salt or as mixed salt which contains for example one or more cations selected from alkali metal ions, for example the sodium ion, or an ammonium ion or alkylammonium cation, for example mono-, di- or trimethyl- or -ethylammonium cations. The dye can be converted by conventional techniques from the free acid into a salt or into a mixed salt or vice versa or from one salt form into another. If desired, the dyes can be further purified by diafiltration, in which case unwanted salts and synthesis by-products are separated from the crude anionic dye. In diafiltration, the crude dye is forced through a semipermeable membrane under an applied pressure to remove salts and synthesis by-products and partly remove water.

The dyes of the formula (I) and their salts are particularly suitable for dyeing or printing fibrous material consisting of natural or synthetic polyamides in yellow shades. The dyes of the formula (I) and their salts are suitable for producing inkjet printing inks and for using these inkjet printing inks to print fibrous material which consists of natural or synthetic polyamides.

The invention accordingly provides from another aspect for the use of the dyes of the formula (I), their salts and mixtures for dyeing or printing fibrous materials consisting of natural or synthetic polyamides. A further aspect is the production of inkjet printing inks and their use for printing fibrous materials consisting of natural or synthetic polyamides.

Dyeing is carried out as per known processes, see for example the dyeing processes described in Ullmanns Encyklopädie der technischen Chemie, 4th Edition, 1982, Volume 22, pages 658-673 or in the book by M. Peter and H. K. Rouette, Grundlagen der Textilveredlung, 13th Edition, 1989, pages 535-556 and 566-574. Preference is given to dyeing in the exhaust process at a temperature of 30 to 100° C., more preferably 80 to 100° C., and at a liquor ratio in the range from 3:1 to 40:1 (liquor ratio from 3:1 to 40:1 means (3 parts per weight of the dyeing bath):(1 part per weight of the substrate to be dyed) to (40 parts per weight of the dyeing bath):(1 part per weight of the substrate to be dyed)).

The substrate to be dyed can be present in the form of yarn, woven fabric, loop-formingly knitted fabric or carpet for example. Fully fashioned dyeings are even permanently possible on delicate substrates, examples being lambswool, cashmere, alpaca and mohair.

The dyes according to the present invention and their salts are highly compatible with known acid dyes. Accordingly, the dyes of the formula (I), their salts or mixtures can be used alone in a dyeing or printing process or else as a component in a combination shade dyeing or printing composition together with other acid dyes of the same class, i.e. with acid dyes possessing comparable dyeing properties, such as for example fastness properties and exhaustion rates from the dyebath onto the substrate. The dyes of the present invention can be used in particular together with certain other dyes having suitable chromophores. The ratio in which the dyes are present in a combination shade dyeing or printing composition is dictated by the hue to be obtained.

The novel dyes of the formula (I), as stated above, are very useful for dyeing natural and synthetic polyamides, i.e. wool, silk and all nylon types, on each of which dyeings having a high fastness level, especially good light fastness and good wet fastnesses (washing at 50° C., alkaline perspiration) are obtained. The dyes of the formula (I) and their salts have a high rate of exhaustion and fixation. The ability of the dyes of the formula (I) and their salts to build up is likewise good. On-tone dyeings on the identified substrates are of outstanding quality. All dyeings moreover have a constant hue under artificial light. Furthermore, the fastness to decating and boiling is good.

One decisive advantage of the novel dyes is the stability of the stock solutions and dyeing liquors produced therewith.

The compounds according to the invention can be used as an individual dye or else, owing to their good compatibility, as a combination element with other dyes of the same class having comparable dyeing properties, for example with regard to general fastnesses, exhaustion value, etc. The combination shade dyeings obtained have similar fastnesses to dyeings with the individual dye.

The invention's dyes of the formula (I) can also be used as yellow components in trichromatic dyeing or printing. Trichromatic dyeing or printing can utilize all customary and known dyeing and printing processes, such as for example the continuous process, exhaustion process, foam dyeing process and ink-jet process.

The composition of the individual dye components in the trichromatic dye mixture used in the process of the invention depends on the desired hue. A brown hue for example preferably utilizes 55-65% by weight of the invention's yellow component, 20-30% by weight of a red component and 10-20% by weight of a blue component.

Particularly preferred blue and/or red components are described in DE3313337.

In the examples which follow, parts and percentages are by weight and temperatures are reported in degrees Celsius.

PREPARATION EXAMPLE 1

30.9 parts of 4-amino-2'-nitro-4'-sulpho-1,1'-diphenylamine are dissolved in 200 parts of water at a pH of 9.5 by addition of 30% aqueous sodium hydroxide solution. After addition of 7 parts of sodium nitrite, this solution is flowed into a mixture of 40 parts of water, 40 parts of ice and 27.5 parts of 30% hydrochloric acid. After half an hour excess nitrite is destroyed with sulphamic acid and a solution of 10.8 parts of m-cresol in 40 parts of water and 10 parts of 30% aqueous sodium hydroxide solution is added in the course of an hour. At the same time, the pH is held at 8 with 30% aqueous sodium hydroxide solution.

The resultant suspension of the monoazo dye of the structure

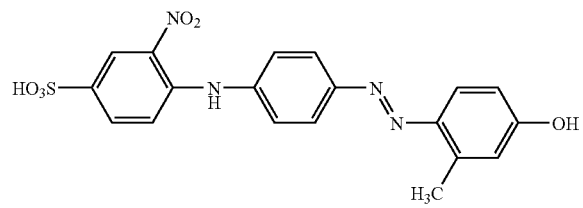

is dissolved with 12 parts of 30% aqueous sodium hydroxide solution at 85°. To this solution are added 24 parts of tert-butylbenzene-4-sulphonyl chloride in the course of 30 minutes at a uniform rate. At the same time, the pH is held between 9 and 9.5 by addition of 30% aqueous sodium hydroxide solution. The addition of 5 parts of sodium chloride is followed by cooling to room temperature and filtration. The dye obtained conforms to the structure

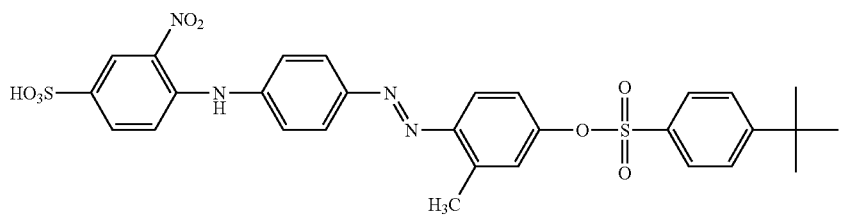

and dyes wool and synthetic polyamides in a brilliant golden yellow hue having good fastnesses. Stock solutions produced therefrom remain clear for several weeks even at room temperature. Its $\lambda_{max}$ value, measured in 1:1 dimethylformamide/water, is 439 nm.

The following examples can be made similarly to Preparation Example 1:

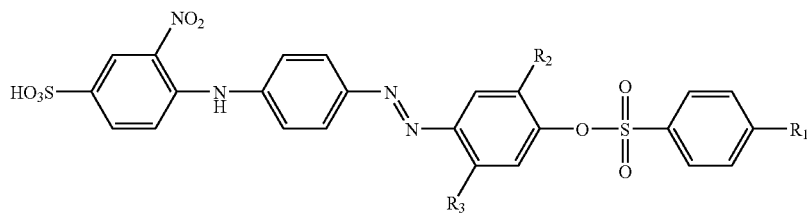

| Example | $R_1$ | $R_2$ | $R_3$ | $\lambda_{max}$ |
|---|---|---|---|---|
| 2 | —CH₂—CH₂—CH₂—CH₃ | H | —CH₃ | 439 |
| 3 | —CH(CH₃)—CH₂—CH₃ | H | —CH₃ | 439 |
| 4 | —CH₂—CH(CH₃)—CH₃ | H | —CH₃ | 439 |
| 5 | —CH₂—CH₂—CH₃ | H | —CH₃ | 439 |

-continued
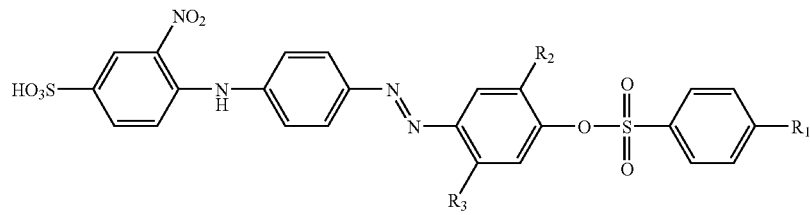
| Example | R₁ | R₂ | R₃ | $\lambda_{max}$ |
|---|---|---|---|---|
| 6 | —CH(CH₃)—CH₃ | H | —CH₃ | 439 |
| 7 | —C(CH₃)(CH₃)—CH₂—CH₃ | H | —CH₃ | 439 |
| 8 | —C(CH₃)₂—CH₃ | —CH₃ | H | 442 |
| 9 | —C(CH₃)₂—CH₃ | H | H | 442 |
| 10 | —C(CH₃)₂—CH₃ | H | —OCH₃ | 447 |
| 11 | —C(CH₃)₂—CH₃ | H | —NHCOCH₃ | 452 |
| 12 | —C(CH₃)(CH₃)—CH₂—CH₃ | H | H | 441 |
| 13 | —CH(CH₃)—CH₂—CH₃ | —CH₃ | H | 442 |
| 14 | —CH(CH₃)—CH₂—CH₃ | H | H | 441 |
| 15 | —CH(CH₃)—CH₃ | CH₃ | H | 442 |
| 16 | —CH₂—CH₂—CH₂—CH₃ | CH₃ | H | 442 |
| 17 | —CH(CH₃)—CH₃ | H | —NHCOCH₃ | 452 |
| 18 | —CH₂—CH₂—CH₃ | —CH₃ | —CH₃ | 450 |

Comparative Test Series 1

A Nylsuisse-Tricot was dyed according to Use Example A (see below) to 3×1/1 Standard Depth=1.80% and the following tests have been performed:

Perspiration ISO105-E04

The test specimen and adjacent fabrics were thoroughly wet out in an alkaline perspiration solution containing:

0.5 g 1-histidine monohydrochloride monohydrate 5 g sodium chloride 2.5 g disodium hydrogen phosphate dihydrate (adjust to pH 8 with 1 n caustic soda) per litre at room temperature and liquor ratio 50:1 and left for 30 min, the excess solution was poured off, the test specimen were placed between 2 glass plates under a pressure of 12.5 kPa (5 kg/40 cm2) and placed in a drying oven for 4 h at 37° C. Without rinsing, the samples were hung to dry in warm air at max. 60° C.

Domestic Laundering ISO 105-C06/B2S, 50° C. and Domestic Laundering ISO 105-C06/B2S, 60° C.:

The test specimen is placed with adjacent undyed fabric in a steel beaker (550 ml volume) and treated with detergent solution (4 g/l ECE phosphate-containing Test Detergent B)) and 1 g/l sodium perborate tetrahydrate, 25 steel balls for 30 minutes in the Launder-Ometer (the total amount of liquor was 150 ml). The sample was rinsed and hang to dry in warm air at max. 60° C.

Evaluation According to Grey Scale Staining ISO 105-A03

For the evaluation a 5-step Grey Scale was used consisting of 5 pairs of swatches of grey and white cloth which illustrate the perceived colour differences corresponding to fastness ratings 5, 4, 3, 2 and 1. The fastness assessment or rating corresponds to that number of the Grey Scale which is closest to the perceived colour distance between the original adjacent fabric and the treated adjacent fabric. (midway between two adjacent steps=intermediate rating e.g. 2-3)

| Test performed | rating of PA 66 (mostly stained adjacent fabric) | |
|---|---|---|
| | C.I. Acid Orange 67 | Dye of Example 1 |
| Perspiration ISO105-E04 | 2.8 | 3.5 |
| Domestic laundering ISO 105-C06/B2S, 50° C. | 2.0 | 2.7 |
| Domestic laundering ISO 105-C06/B2S, 60° C. | 1.2 | 1.6 |

Comparative Test Series 2

A wool gabardine was dyed according to Use Example C (see below) to 3×1/1 standard depth=2.25% and the following tests have been performed:

Hot Water 70° C., ISO 105-E08 the test specimen and adjacent fabrics were rolled tightly round a glass rod, a yarn was loosely wound over them and treat for 30 min at 70° C. in slightly acid water (pH 6 with acetic acid), liquor ratio 30:1. The test specimen was removed from glass rod, squeezed and was hung without rinsing to dry in warm air at max. 60° C. Assessment: Adjacent fabric: Staining according to ISO 105-A03 (see above)

Milling Alkaline, ISO 105-E12 the test specimen and adjacent fabrics with 50 stainless steel balls were placed in a steel beaker (550 ml volume). Milling solution (50 g/l soap and 10 g/l anhydrous sodium carbonate) was added at a liquor ratio 3:1 and treated for 2 h at 40° C. in the Launder-Ometer. Then liquor ratio of 100:1 was adjusted with 40° C. warm demineralized water and treated for another 10 min. The test specimen were rinsed in cold demineralized water and then in cold running tapwater for 10 min, squeezed and hung to dry in warm air at max. 60° C. Assessment: Adjacent fabric: Staining according to ISO 105-A03 (see above)

Water ISO 105-E01

The test specimen with adjacent fabrics were wet out completely with demineralized water at room temperature, and the excess water was poured off. The test specimen were placed between two glass plates loaded with a pressure of 12.5 kPa (5 kg/40 cm2) and placed in a drying oven for 4 h at 37° C. Without rinsing the specimens hung to dry in warm air at max. 60° C. Assessment: Adjacent fabric: Staining according to ISO 105-A03 (see above)

| Test performed | rating of mostly stained adjacent fabric ([1]= wool, [2]= PA 66) | |
|---|---|---|
| | C.I. Acid Orange 67 | Dye of Example 1 |
| Hot water 70° C., ISO 105-E08 | 2.6[1] | 3.8[1] |
| Milling alkaline, ISO 105-E12 | 2.2[1] | 3.4[1] |
| washing 40° C., Water ISO 105-E01 | 3.2[2] | 4.1[2] |

Comparative Test Series 3

In 160 ml of water a certain amount of dyestuff was dissolved at 90° C. and the resulting solution was diluted to 200 ml by adding water of 90° C. This solution was put in a water bath kept at 25° C. and after the dye solution was at 25° the dye solution was let for 48 hour without stirring or shaking at 25° C.

The solution was visually inspected first and the filtrated trough 2 layers of paper filters of 70 mm diameter (Typ 1450 CV obtainable from Schleicher & Schuell MicroScience GmbH Hahnestrasse 3; D-37586 Dassel). The time for passing of the 200 ml of dye solution was measured and the upper filter was inspected visually. Grades are given and a grade of 5 signifies no residue, 4 signifies little, fine residues, 3 signifies bigger residues, 2 signifies coarse residues and 1 signifies a compact layer of precipitated dyestuff.

|  | Aspect of the solution after the 48 hours | | Grade of the visual inspection of the upper filter | | time for passing of the 200 ml of dye solution trough the 2 filter layers | |
|---|---|---|---|---|---|---|
| Concentration of the solution | C.I. Acid Orange 67 | Dye of Example 1 | C.I. Acid Orange 67 | Dye of Example 1 | C.I. Acid Orange 67 | Dye of Example 1 |
| 6 g/Liter | 1) | 2) | 4 | 4 | 16 sec | 6 sec |
| 12 g/Liter | 1) | 2) | 3 | 3 to 4 | 27 sec | 7 sec |
| 20 g/Liter | 1) | 2) | 2 to 3 | 3 | 33 sec | 7 sec |
| 30 g/Liter | 1) | 2) | 1 to 2 (residue) | 2 to 3 | 95 sec | 8 sec |

1) after cooling down turned immediately cloudy
2) remained clear after cooling down

USE EXAMPLE A

A dyebath at 40° C., consisting of 2000 parts of water, 1 part of a weakly cation-active levelling agent which is based on an ethoxylated aminopropyl fatty acid amide and which has affinity for dye, 0.5 parts of the dye of Preparation Example 1 and adjusted to pH 5 with 1-2 parts of 40% acetic acid is entered with 100 parts of nylon-6 fabric. After 10 minutes at 40° C., the dyebath is heated to 98° C. at a rate of 1° C. per minute and then left at the boil for 45-60 minutes. Thereafter it is cooled down to 70° C. over 15 minutes. The dyeing is removed from the bath, rinsed with hot and then with cold water and dried. The result obtained is a yellow polyamide dyeing possessing good light and wet fastnesses.

USE EXAMPLE B

A dyebath at 40° C., consisting of 2000 parts of water, 1 part of a weakly cation-active levelling agent which is based on an ethoxylated aminopropyl fatty acid amide and which has affinity for dye, 0.5 parts of the dye of Preparation Example 1 and adjusted to pH 5.5 with 1-2 parts of 40% acetic acid is entered with 100 parts of nylon-6,6 fabric. After 10 minutes at 40° C., the dyebath is heated to 120° C. at a rate of 1.5° C. per minute and then left at this temperature for 15-25 minutes. Thereafter it is cooled down to 70° C. over 25 minutes. The dyeing is removed from the dyebath, rinsed with hot and then with cold water and dried. The result obtained is a yellow polyamide dyeing with good levelness and having good light and wet fastnesses.

USE EXAMPLE C

A dyebath at 40° C., consisting of 4000 parts of water, 1 part of a weakly amphoteric levelling agent which is based on a sulfated, ethoxylated fatty acid amide and which has affinity for dye, 0.8 parts of the dye of Preparation Example 1 and adjusted to pH 5 with 1-2 parts of 40% acetic acid is entered with 100 parts of wool fabric. After 10 minutes at 40° C., the dyebath is heated to boiling at a rate of 1° C. per minute and then left at the boil for 40-60 minutes. Thereafter it is cooled down to 70° C. over 20 minutes. The dyeing is removed from the bath, rinsed with hot and then with cold water and dried. The result obtained is a yellow wool dyeing possessing good light and wet fastnesses.

USE EXAMPLE D 100 parts of a woven nylon-6 material are padded with a 50° C. liquor consisting of

| | | |
|---|---|---|
| 40 | parts | of the dye of Preparation Example 1, |
| 100 | parts | of urea, |
| 20 | parts | of a nonionic solubilizer based on butyldiglycol, |
| 15-20 | parts | of acetic acid (to adjust the pH to 4), |
| 10 | parts | of a weakly cation-active levelling agent which is based on an ethoxylated aminopropyl fatty acid amide and has affinity for dye, and |
| 810-815 | parts | of water (to make up to 1000 parts of padding liquor). |

The material thus impregnated is rolled up and left to dwell in a steaming chamber under saturated steam conditions at 85-98° C. for 3-6 hours for fixation. The dyeing is then rinsed with hot and cold water and dried. The result obtained is a yellow nylon dyeing having good levelness in the piece and good light and wet fastnesses.

USE EXAMPLE E

A textile cut pile sheet material composed of nylon-6 and having a synthetic base fabric is padded with a liquor containing per 1000 parts

| | |
|---|---|
| 2 parts | of dye of Preparation Example 1 |
| 4 parts | of a commercially available thickener based on carob flour ether |
| 2 parts | of a nonionic ethylene oxide adduct of a higher alkylphenol |
| 1 part | of 60% acetic acid. |

This is followed by printing with a paste which per 1000 parts contains the following components:

| | |
|---|---|
| 20 parts | of commercially available alkoxylated fatty alkylamine (displace product) |
| 20 parts | of a commercially available thickener based on carob flour ether. |

The print is fixed for 6 minutes in saturated steam at 100° C., rinsed and dried. The result obtained is a level-coloured cover material having a yellow and white pattern.

USE EXAMPLE F

A dyebath at 40° C. consisting of 2000 parts of water, 1 part of a weakly cation-active levelling agent which is based on an ethoxylated aminopropyl fatty acid amide and has affinity for dye, 0.5 part of the dye of Preparation Example 1, 0.4 parts of a commercially available preparation of C.I. Acid Red 336 and 0.5 part of a commercially available preparation of C.I. Acid Blue 350 adjusted to pH 5 with 1-2 parts of 40% acetic acid is entered with 100 parts of woven wool fabric. After 10 minutes at 40° C., the dyebath is heated to 98° C. at a rate of 1° C. per minute and then left at the boil for 45 to 60 minutes. This is followed by cooling down to 70° C. over 15 minutes. The dyeing is removed from the bath, rinsed with hot and then with cold water and dried. The result obtained is a level brown wool dyeing having good light and wet fastnesses.

USE EXAMPLE G 100 parts of a chrome-tanned and synthetically retanned shave-moist grain leather are dyed for 30 minutes in a bath of 300 parts of water and 2 parts of the dye of Preparation Example 1 at 55° C. After addition of 4 parts of a 60% emulsion of a sulphited fish oil, the leather is fatliquored for 45 minutes. It is then acidified with 8.5% formic acid and milled for 10 minutes (final pH in the bath 3.5-4.0). The leather is then rinsed, allowed to drip dry and finished as usual. The result obtained is a leather dyed in a level clear yellow hue with good fastnesses.

Use Examples A to G can also be carried out with dyes 2 to 18 with similar results.

USE EXAMPLE H 3 parts of the dye of Preparation Example 3 are dissolved in 82 parts of demineralized water and 15 parts of diethylene glycol at 60° C. Cooling down to room temperature gives a yellow printing ink which is very highly suitable for ink jet printing on paper or polyamide and wool textiles.

Use Example H can also be carried out with dyes 1 or 2 and 4 to 18 with similar results.

The invention claimed is:

1. A compound of formula (I)

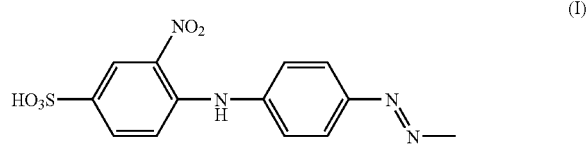

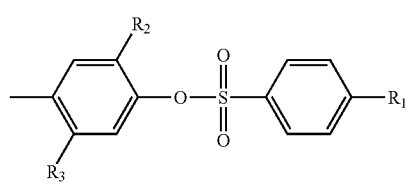

wherein $R_1$ is unbranched or branched $C_{-6}$alkyl, $R_2$ is H or methyl or unbranched $C_{2-4}$alkyl or branched $C_{3-4}$alkyl, $R_3$ is H or methyl or unbranched $C_{2-4}$alkyl or branched $C_{3-4}$alkyl or methoxy or unbranched —$OC_{2-4}$alkyl or branched —$OC_{3-4}$alkyl or —NHCO—($C_{1-4}$alkyl) with an unbranched $C_{1-4}$alkyl group or —NHCO—($C_{3-4}$alkyl) with a branched $C_{3-4}$alkyl group.

2. A compound according to claim 1, wherein $R_1$ is unbranched or branched $C_{-6}$alkyl, $R_2$ is H or methyl $R_3$ is H, methyl, methoxy, ethoxy or acetylamino.

3. A process for preparing compounds of formula (I) according to claim 1, comprising the step of esterifying a compound of the formula (II)

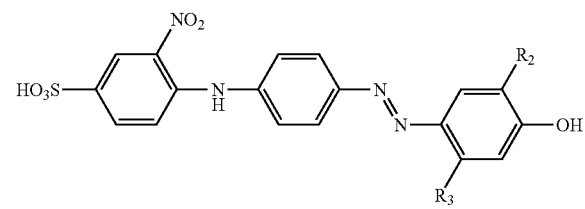

under basic conditions with a substituted sulphonyl chloride of formula (III)

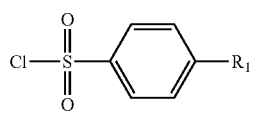

wherein $R_1$ is unbranched or branched $C_{-6}$alkyl, $R_2$ is H or methyl or unbranched $C_{2-4}$alkyl or branched $C_{3-4}$alkyl $R_3$ is H or methyl or unbranched $C_{2-4}$alkyl or branched $C_{3-4}$alkyl or methoxy or unbranched —$OC_{2-4}$alkyl or branched —$OC_{3-4}$alkyl or —NHCO—($C_{1-4}$alkyl) with an unbranched $C_{1-4}$alkyl group or —NHCO—($C_{3-4}$alkyl) with a branched $C_{3-4}$alkyl group.

4. A process for dyeing and/or printing an organic substrate, comprising the step of contacting the organic substrate with at least one compound of claim 1, a salt of the at least one compound of claim 1 or a mixture thereof.

5. A process according to claim 4, wherein the organic substrate is selected from the group consisting of wool, silk, synthetic polyamide, and mixtures thereof.

6. A process for producing a printing ink for the InkJet process, comprising the step of adding at least one compound of claim 1, a salt of the at least one compound of claim 1 or a mixture thereof to said printing ink.

7. A printing ink comprising at least one compound of claim 1 or a salt of the at least one compound of claim 1 or a mixture thereof.

8. An organic substrate made by the process in accordance with claim 4.

9. A process for producing an inkjet ink, comprising the step of combining at least one compound of formula (I) according to claim 1, with at least one additional chemical and/or water.

* * * * *